United States Patent
Moore

(10) Patent No.: US 7,093,297 B2
(45) Date of Patent: Aug. 15, 2006

(54) METHOD AND APPARATUS FOR MONITORING A NETWORK DATA PROCESSING SYSTEM

(75) Inventor: Lawrence Martin Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 10/185,690

(22) Filed: Jun. 27, 2002

(65) Prior Publication Data

US 2004/0003294 A1    Jan. 1, 2004

(51) Int. Cl.
*H04L 9/32* (2006.01)
*G06F 7/04* (2006.01)
*G06F 11/00* (2006.01)

(52) U.S. Cl. .............................. 726/26; 726/2; 726/21; 726/27; 726/28

(58) Field of Classification Search ................. 726/21, 726/22, 23, 26, 27, 28, 2; 713/187, 188, 713/193, 194
See application file for complete search history.

(56) References Cited

U.S. PATENT DOCUMENTS

| | | | |
|---|---|---|---|
| 6,405,318 B1 * | 6/2002 | Rowland | 726/22 |
| 6,460,141 B1 * | 10/2002 | Olden | 726/4 |
| 6,647,400 B1 * | 11/2003 | Moran | 726/23 |
| 6,799,277 B1 * | 9/2004 | Colvin | 726/22 |
| 2004/0221178 A1 * | 11/2004 | Aaron et al. | 713/201 |

* cited by examiner

*Primary Examiner*—Matthew Smithers
*Assistant Examiner*—Courtney Fields
(74) *Attorney, Agent, or Firm*—Duke W. Yee; Mark E. McBurney; Mari Stewart

(57) ABSTRACT

A method, apparatus, and computer instructions for identifying unauthorized users. User actions are monitored in an audit for an indication an unauthorized user logged into the data processing system with a valid user identifier and a valid password. An action is initiated in response to an indication of an unauthorized user.

24 Claims, 3 Drawing Sheets

METHOD AND APPARATUS FOR MONITORING A NETWORK DATA PROCESSING SYSTEM

BACKGROUND OF THE INVENTION

1. Technical Field

The present invention relates generally to an improved data processing system, and in particular, to a method and apparatus for processing data. Still more particularly, the present invention provides a method and apparatus for monitoring actions taken in a network data processing system.

2. Description of Related Art

With the proliferation of computers and ever-increasing computing power available to nearly every person in developed countries, computers have changed the lives of countless millions of people. With this increased access to computers worldwide, hacking and unauthorized access to networks has become an increasingly serious problem. Hackers or other persons attempt to gain access to networks and computers to secure information and/or perform some prank or mischief. A person may try to gain unauthorized access to a network to obtain information, such as credit card numbers, confidential technology, or business information. A person also may try to cripple a network or deface a Web site as a prank.

Currently, some security measures include limiting access to a network or computer by most users to normal business hours, limiting access to key files in the root, and requiring new passwords to be used at regular intervals. These measures and other currently available measures, are good for minimizing illegal break-ins, but have limits.

For example, if the person trying to gain access to the network has the user ID and password for an administrator with root access, this person can gain access to all of the system resources. A hacker failing to gain access to one resource is able to browse and attempt to access other resources. Also, if the hacker performs tasks allowed to be performed by the user, nothing can be done about those actions. For example, if the stolen user ID and password is for a user that has access to credit card numbers on a network, then the hacker may access those numbers.

Therefore, the present invention provides an improved method, apparatus, and computer implemented instructions for preventing unauthorized access to a network or computer system.

SUMMARY OF THE INVENTION

The present invention provides a method, apparatus, and computer instructions for identifying unauthorized users. User actions are monitored in an audit for an indication an unauthorized user logged into the data processing system with a valid user identifier and a valid password. An action is initiated in response to an indication of an unauthorized user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
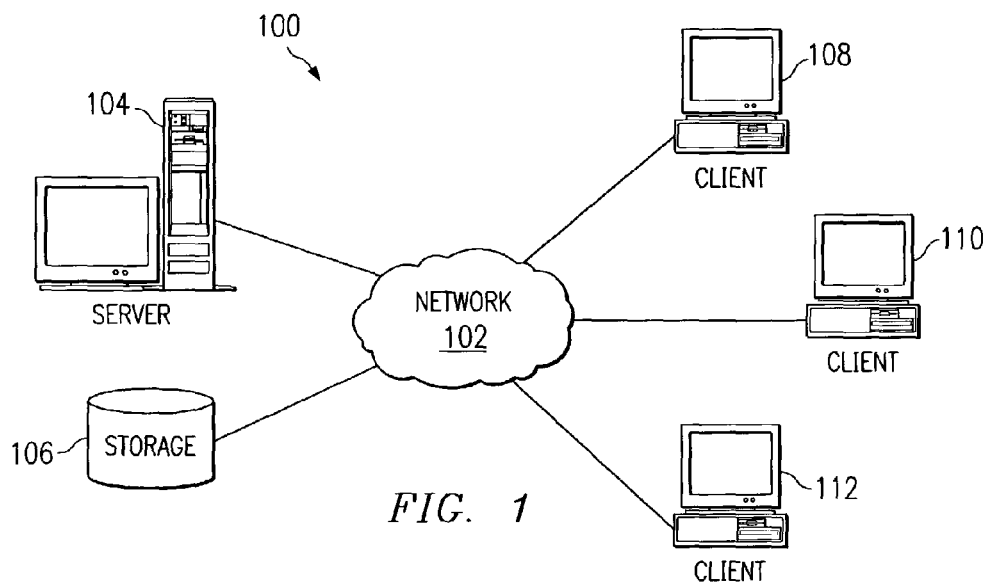
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
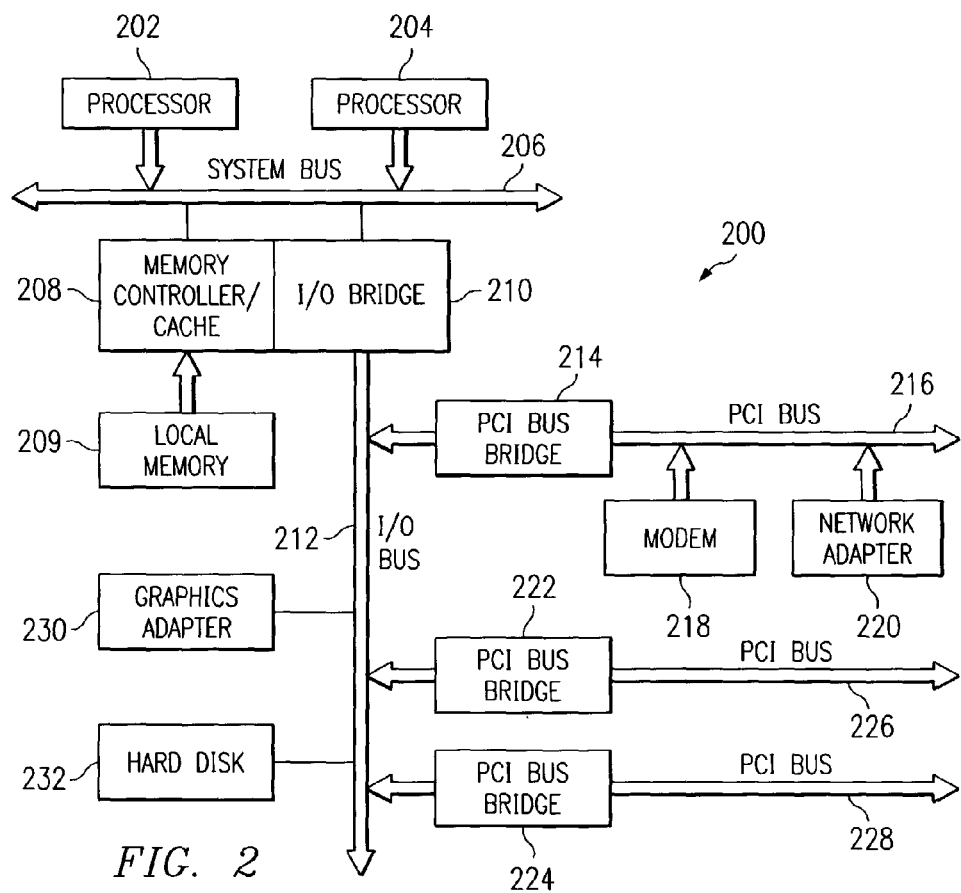
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eerier pSeries system, a product of International Business Machines Corporation in Armonk, New York, running the Advanced Interactive Executive (AIX) operating system or LINUX operating system.

Figure 3:
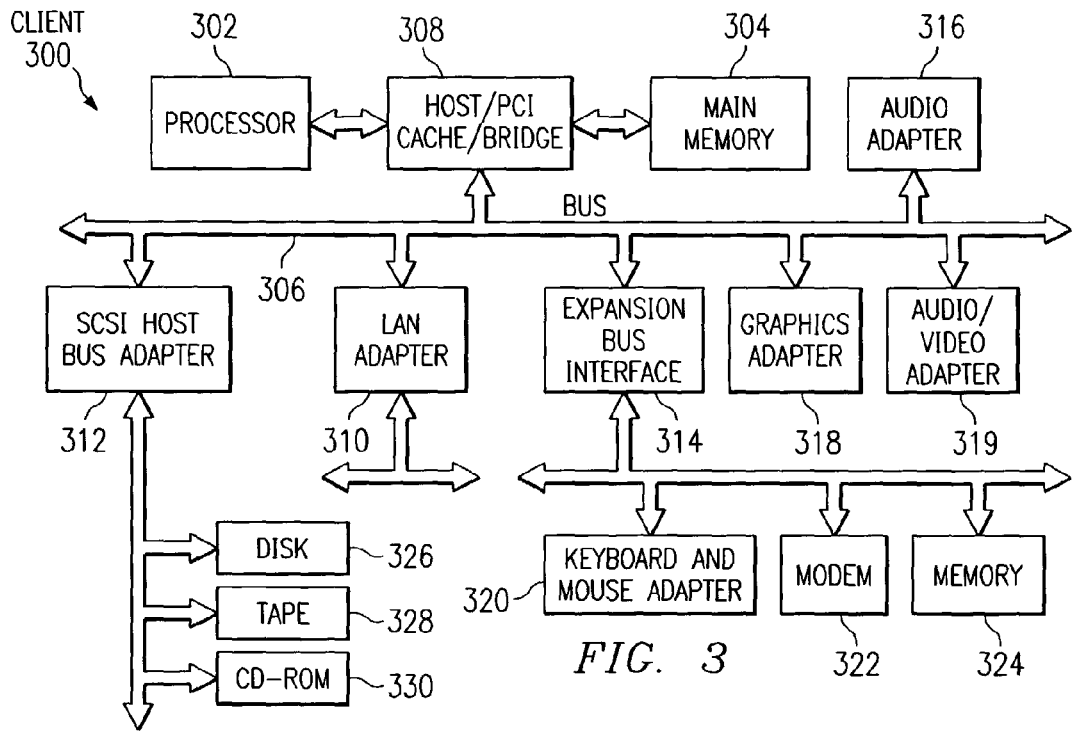
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention recognizes that a hacker or other person may access a network data processing system or a computer using a valid ID and password for an authorized user. The present invention also recognizes that a hacker with this ID and password may take actions that are not characteristic of the user assigned to the ID. Thus, the present invention provides a method, apparatus, and computer implemented instructions for monitoring for unauthorized access in a network data processing system. The mechanism of the present invention is especially useful in monitoring for activities initiated using a valid user ID and password. In particular, user actions are monitored and used to establish a table or history of normal user actions. Additionally, a table of user actions may be created based on expected user tasks. When a hacker breaking into a computer network or system performs actions that are not consistent for the particular user ID, this type of activity is identified and flagged for further action.

Figure 4:
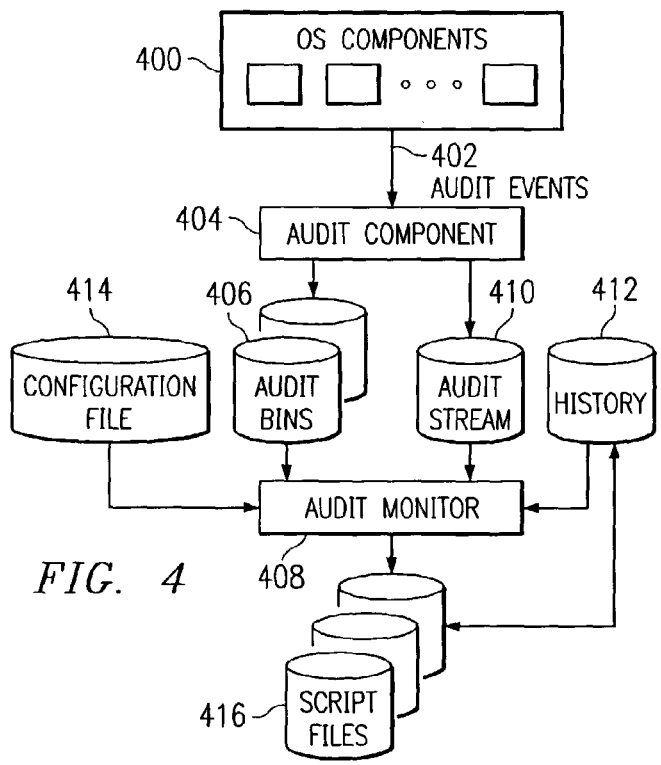
FIG. 4 is a diagram illustrating components used in monitoring activities in a network data processing system in accordance with a preferred embodiment of the present invention.

With reference now to FIG. 4, a diagram illustrating components used in monitoring activities in a network data processing system is depicted in accordance with a preferred embodiment of the present invention. In this example, operating system components 400 generate audit events 402, which are detected by audit component 404. These events are recorded in files referred to in these examples as audit bins 406. In these examples, audit events 402 are user activities. The particular audit events stored in audit bins 406 may be all user activities or some subset of activities, such as, for example, different user activities applied to files in the network data processing system. These events may be, for example, a file open or a file read. The information recorded in audit bins 406 includes, for example, the particular activity and the date and time of the activity.

In many systems, all system activity is recorded in audit bins 406. This activity includes even those performed by a root user. Although audit component 404 is presently available in operating systems, such as AIX, no process for using or analyzing these records is available to monitor for unauthorized access by a hacker using a valid ID and password stolen or illegally obtained from a user.

The mechanism of the present invention adds a new component, audit monitor 408, which may read and monitor events stored in audit bins 406 or monitor events in more real-time fashion by monitoring audit stream 410. In these examples, audit monitor 408 is a kernel extension of the operating system. In these examples, as a kernel extension in an AIX operating system, this component is available to any machine using an AIX operating system, client or server. This component also may be used in a standalone data processing system to allow a single user to monitor activities within the machine to monitor for unauthorized access. Audit monitor 408 is used to identify patterns of activities in audit events 402 that are not typical for a user ID. With audit bins 406, one file is typically filled with audit events. When that file is full, a second file is filled with audit events, while the first file is processed by audit monitor 408. Through audit stream 410, audit monitor 408 may receive audit events in a more real-time fashion.

Audit monitor 408 takes action based on incoming audit events. Specifically, audit monitor 408 reviews actions for each user and may establish a table of normal actions stored in history 412. In these examples, configuration file 414 is used to identify scripts or processes to process different types of audit events detected by audit monitor 408. This file is maintained by a system administrator in these examples and is used by audit monitor 408 to determine which types of audit events to monitor and associate those events with a script file in script files 416. For example, configuration file 414 may be used to tell audit monitor 408 to monitor all file related events, such as file open, file close, and copy. This configuration file also may be used to tell audit monitor 408 which script in script files 416 to execute. For example, a script called "check file" may be executed when file related events occur. This script file may receive a file name, a path name, a user name, and a date. This script also may disable or log off a user trying to read an invalid file.

When audit monitor 408 identifies an activity, this activity is compared to those in configuration file 414. If a match occurs, then the script associated with the activity is executed to process the activity. Through the use of configuration file 414, the analysis of selected activities may be selectively configured for each particular system because not all activities necessarily need to be analyzed depending on the particular implementation.

Script files 416 contains processes used to analyze the actions in the audit events for a user. Script files 416 may use history 412 to determine whether actions taken by the user are consistent with those by an authorized user. For example, audit monitor 408 stores activities for user X in history 412 for the last ten log ins. After the tenth log in, the monitor would keep user X's activities that existed in eight out of the ten logs. In this example, the logs indicate two things: (1) User X always reads mail first, and (2) User X never logs in anytime from 11 p.m. to 5 a.m.

With this information, audit monitor 408 now knows user X's activities. If a person logging in as user X logs in at midnight, or if user X doesn't read her mail first, the script may deactivate user X's account. A non-authorized user may have obtained user X's user ID and password. A script used for processing activities after log in may identify that the actions in the audit events are not consistent with those for user X even though a successful log in to the system has occurred. Thus, the use of audit events and history 412 may be used to identify potential hackers.

If the actions are not consistent with those for an authorized user, appropriate security measures may be taken. These security measures may include, for example, notifying a system administrator of a potential intrusion, logging off the user, and changing the password to a backup password. Script files 416 also may include script processes for establishing history 412.

Figure 5:
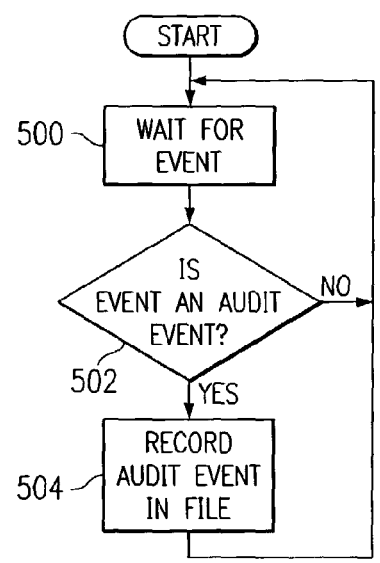
FIG. 5 is a flowchart of a process used for recording audit events in accordance with a preferred embodiment of the present invention.

Turning now to FIG. 5, a flowchart of a process used for recording audit events is depicted in accordance with a preferred embodiment of the present invention. The process illustrated in FIG. 5 may be implemented in an audit component, such as audit component 404 in FIG. 4.

The process begins by waiting for an event (step 500). A determination is made as to whether the event is an audit event (step 502). If the event is an audit event, the audit event is recorded in the file (step 504) and the process returns to step 500 as described above. With reference again to step 502, if the event is not an audit event, the process returns to step 500 as described above.

Figure 6:
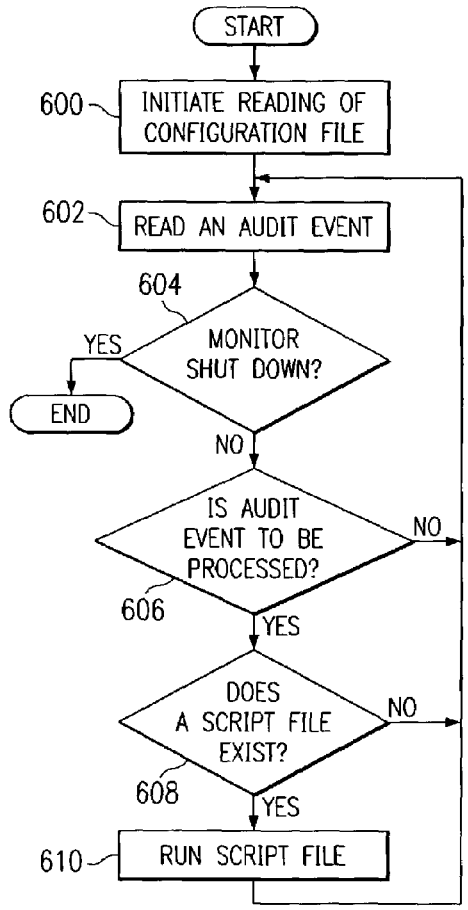
FIG. 6 is a flowchart of a process used for monitoring events in accordance with a preferred embodiment of the present invention.

With reference now to FIG. 6, a flowchart of a process used for monitoring events is depicted in accordance with a preferred embodiment of the present invention. The process illustrated in FIG. 6 may be implemented in an audit monitor, such as audit monitor 408 in FIG. 4.

The process begins by initiating a read of a configuration file (step 600). This configuration file may be, for example, configuration file 414 in FIG. 4 and is used to determine what actions to take in response to different audit events. An audit event is read (step 602). The audit event will be read from a file in audit bins 406 in FIG. 4. Alternatively, the audit event may be read in a more real-time fashion, such as through audit stream 410 in FIG. 4.

Next, a determination is made as to whether the monitor is shut down (step 604). Step 404 may be initiated by a system administrator. If the monitor is not shut down, a determination is made as to whether the audit event is to be processed (step 606). The determination of whether an audit event is to be processed is based on the type of audit events identified in the configuration file. If the audit event is to be processed, a determination is made as to whether a script file exists (step 608). If a script file exists, the script file is run (step 610) and the process returns to step 602 as described above to process other audit events.

Returning again to step 608, if a script file does not exist, the process returns to step 602 as described above. With reference again to step 606, if the audit event is not to be processed, the process returns to step 602 as described above. Referring again to step 604, if the monitor is shut down, the process terminates.

Figure 7:
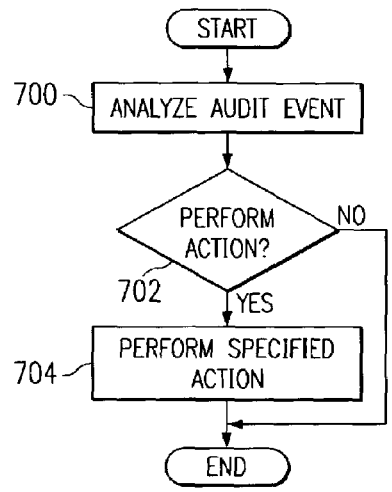
FIG. 7 is a flowchart of a process used for processing an audit event in accordance with a preferred embodiment of the present invention.

Turning now to FIG. 7, a flowchart of a process used for processing an audit event is depicted in accordance with a preferred embodiment of the present invention. The process illustrated in FIG. 7 may be implemented in a script, such as one in script files 416 in FIG. 4.

The process begins by analyzing an audit event (step 700). The audit event may be analyzed using numerous types of processes depending on the particular implementation. As part of the processing, the audit event may be compared to a history of user actions, such as those stored in history 412 in FIG. 4. Additionally, the process may analyze a series of audit events to see if the pattern of these events matches the history of events stored for a particular user. This analysis is used to determine whether a potential unauthorized access using a valid user ID and password has occurred.

A determination is made as to whether to perform an action (step 702). An action may be taken if the event has been identified as one for an unauthorized user. If an action is to be performed, the specified action is performed (step 704) and the process terminates thereafter. This action may include, for example, logging off the user, invalidating the user ID, changing access permissions to selected resources, and/or sending a notification to a system administrator. Referring again to step 702, if an action is not to be performed, the process terminates.

Figure 8:
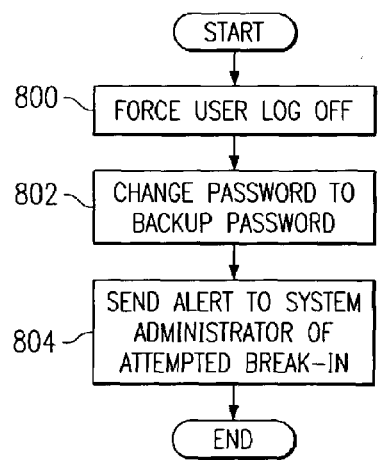
FIG. 8 is a flowchart of a process used for handling an unauthorized access in accordance with a preferred embodiment of the present invention.

With reference now to FIG. 8, a flowchart of a process used for handling an unauthorized access is depicted in accordance with a preferred embodiment of the present invention. The process illustrated in FIG. 8 is a more detailed description of a specified action described in step 704 in FIG. 7. The process begins by forcing the user to log off (step 800). The password is changed to a backup password (step 802). An alert is sent to the system administrator of an attempted break-in (step 804) and the process terminates thereafter.

The processes described in FIGS. 6 and 7 may be implemented in a script written by a system administrator. The script may require the system administrator to perform a series of tasks in order to be identified as the valid administrator. For example, the system administrator might have to create an empty directory called "\IDENTIFY" in order to be identified as the valid root. Audit events recorded and monitored would report would report the new directory when the directory is created. If a hacker breaks into the system, but fails to create "\IDENTIFY," the script identifies the user as an invalid or unauthorized user and may take steps, such as those described in FIG. 8 above.

An example of another script that may be implemented is one that monitors for attempts to read critical files. A hacker may fail in an attempt to read any critical files, but the audit monitor may not be so forgiving. The script can be designed such that if anyone (other than the root) tries to read any files in the "/etc" directory outside of office hours, then that script would disable that user's access. The user does not have to successfully read a file, but the user's account can be disabled simply for trying to read that file. A hacker can be shut out for making one mistake.

Thus, the present invention provides an improved method, apparatus, and computer implemented instructions for securing networks and computers. The mechanism of the present invention includes a monitoring system for monitoring activities of users logged on to the system. Based on a particular user activity or pattern of activities, the mechanism of the present invention may identify an unauthorized user of the particular user ID. As described above, this identification may be based on the occurrence of an activity that is never taken by a user or the occurrence of the activity at a particular time. Further, the mechanism of the present invention also may analyze patterns of activities.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The examples described monitoring for and detecting unauthorized users using valid IDs and passwords. Further, the mechanism of the present invention may be extended to monitoring for events to authorize a user even though the user is logged in with a valid user ID and password. A script may be set up to monitor for a series of tasks or actions by a user before the user is considered as a trusted user. For example, a script may be set up to determine whether a system administrator has read email before deleting any files in the system. If these events occur, then the user is a trusted user. Otherwise, permissions may be changed to prevent deletion of files and any attempted deletions may result in other security actions being taken. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for identifying unauthorized users, the method comprising:
   monitoring for user actions in an audit for an indication an unauthorized user logged into the data processing system with a valid user identifier and a valid password;
   comparing a user action to selected activities to determine whether the user action is a selected user action;
   responsive to the user action being the selected user action, initiating a process to analyze the selected user action, wherein the process determines whether the selected user action is from an unauthorized user; and
   responsive to the selected being from an unauthorized user, initiating an action to handle an unauthorized access.

2. The method of claim 1 further comprising:
   initiating a program to monitor user actions for a series of selected user actions to authorize a user logged into the data processing system with a valid user identifier and a valid password; and
   determining whether to authorize the user as a trusted user, wherein the user is authorized as a trusted user if the series of selected user actions occur.

3. The method of claim 2, wherein the program is a script.

4. The method of claim 1 further comprising:
   recording the user actions to form the audit.

5. The method of claim 1 further comprising:
   maintaining a configuration file, wherein the configuration file includes an identification of a program associated with the selected user action for use in analyzing the selected user action to determine whether the user is an authorized user logged into the data processing system with a valid user identifier and a valid password.

6. The method of claim 1 wherein the process is a script.

7. The method of claim 1 further comprising:
   analyzing a series of user actions to determine whether actions taken by a user are consistent with user actions by an authorized user, wherein user actions are stored in a history for the user.

8. The method of claim 1 further comprising:
   responsive to detecting an unauthorized user, logging off the unauthorized user; and
   responsive to detecting an unauthorized user, changing the password to a backup password.

9. A method in a data processing system for handling unauthorized access to a network data processing system, the method comprising:
recording user actions for each user logged into the network data processing system, wherein an audit is formed;
monitoring for a pattern of user actions indicating a user is an unauthorized user;
analyzing the pattern of user actions to determine whether the user is unauthorized user, wherein the pattern of user actions is processed by a script; and
initiating a security action if the user is identified as an unauthorized user.

10. The method of claim 9, wherein the security action includes at least one of suspending access by the user, sending an alert to a system administrator, and tracing the user.

11. A data processing system for identifying unauthorized users, the data processing system comprising:
a bus system;
a communications unit connected to the bus system;
a memory connected to the bus system, wherein the memory includes a set of instructions; and
a processing unit connected to the bus system, wherein the processing unit executes the set of instructions to monitor for user actions in an audit for an indication an unauthorized user logged into the data processing system with a valid user identifier and a valid password; compare a user action to selected activities to determine whether the user action is a selected user action; responsive to the user action being the selected user action, initiate a program to analyze the selected user action, wherein the process determines whether the selected user action is form an unauthorized user; and initiate an action to handle an unauthorized access in response to the selected action being from an unauthorized user, wherein an unauthorized user is logged off the system and the password is changed to a backup password.

12. A data processing system for handling unauthorized access to a network data processing system, the data processing system comprising:
a bus system;
a communications unit connected to the bus system;
a memory connected to the bus system, wherein the memory includes a set of instructions; and
a processing unit connected to the bus system, wherein the processing unit executes the set of instructions to record user actions for each user logged into the network data processing system in which an audit is formed; monitor for a pattern of user actions indicating a user is an unauthorized user; analyze the pattern of user actions to determine whether the user is an unauthorized user, wherein the pattern of user actions is processed by a script; initiate a security action if the user is identified as an unauthorized user, wherein an unauthorized user is logged off the system and a password for the user is changed to a backup password.

13. A data processing system for identifying unauthorized users, the data processing system comprising:
monitoring means for monitoring for user actions in an audit for an indication an unauthorized user logged into the data processing system with a valid user identifier and a valid password;
comparing means for comparing a user action to selected activities to determine whether the user action is a selected action;
initiating means for initiating a process to analyze the selected user action in response to the user action being the selected user action, wherein the process determines whether the selected user action is from an unauthorized user; and
initiating means, responsive to the selected action being from an unauthorized user, initiating an action to handle an unauthorized access.

14. The data processing system of claim 13, further comprising:
initiating a program to monitor user actions for a series of selected user actions to authorize a user logged into the data processing system with a valid user identifier and a valid password; and
determining whether to authorize the user as a trusted user, wherein the user is authorized as a trusted authorized user if the series of selected user actions occur.

15. The data processing system of claim 14, wherein the program is a script.

16. The data processing system of claim 13 further comprising:
recording means for recording the user actions to form the audit.

17. The data processing system of claim 13 further comprising:
maintaining means for maintaining a configuration file, wherein the configuration file includes an identification of a program associated with the selected user action for use in analyzing the selected user action to determine whether the user is an unauthorized user logged into the data processing system with a valid user identifier and a valid password.

18. The data processing system of claim 13 wherein the process is a script.

19. The data processing system of claim 13 further comprising:
analyzing a series of user actions to determine whether actions taken by a user are consistent with user actions by an authorized user, wherein user actions are stored in a history for the user.

20. The data processing system of claim 13 further comprising:
logging means, responsive to detecting an unauthorized user, for logging off the unauthorized user; and
changing means, responsive to detecting an unauthorized user, for changing the password to a backup password.

21. A data processing system for handling unauthorized access to a network data processing system, the data processing system comprising:
recording means for recording user actions for each user logged into the network data processing system, wherein an audit is formed;
monitoring means for monitoring for a pattern of user actions indicating a user is an unauthorized user;
analyzing means for analyzing the pattern of user actions to determine whether the user is an unauthorized user, wherein the pattern of user actions is processed by a script; and
initiating means for initiating a security action if the user is identified as an unauthorized user.

22. The data processing system of claim 21, wherein the security action includes at least one of suspending access by the user, sending an alert to a system administrator, and tracing the user.

23. A computer program product in a computer readable medium for identifying unauthorized users, the computer program product comprising:

first instructions for monitoring for user actions in an audit for an indication an unauthorized user logged into the data processing system with a valid user identifier and a valid password;

second instructions for comparing a user action to selected activities to determine whether the user action is a selected user action;

third instructions, responsive to the user action being the selected user action, for initiating a process to analyze the selected user action, wherein the process determines whether the selected user action is from an unauthorized user; and fourth instructions, responsive to the selected action being from an unauthorized user, for initiating an action to handle an unauthorized access.

24. A computer program product in a computer readable medium for handling unauthorized access to a network data processing system, the computer program product comprising:

first instructions for recording user actions for each user logged into the network data processing system, wherein an audit is formed;

second instructions for monitoring for a pattern of user actions indicating a user is an unauthorized user;

third instruction means for analyzing the pattern of user actions to determine whether the user is an unauthorized user, wherein the pattern of user actions is processed by a script and fourth instructions for initiating a security action if the user is identified as an unauthorized user.

* * * * *